(12) United States Patent
Ptasinski

(10) Patent No.: US 6,869,150 B2
(45) Date of Patent: Mar. 22, 2005

(54) TIRE STEP

(76) Inventor: Zygmunt James Ptasinski, 307 Cherry Cove La., Round Lake Beach, IL (US) 60073

( * ) Notice: Subject to any disclaimer, the term of this patent is extended or adjusted under 35 U.S.C. 154(b) by 0 days.

(21) Appl. No.: 10/198,860

(22) Filed: Jul. 19, 2002

(65) Prior Publication Data

US 2004/0012245 A1 Jan. 22, 2004

(51) Int. Cl.[7] .......................... B60B 27/00; B60B 7/18; B60R 3/00
(52) U.S. Cl. ............................. 301/108.4; 301/37.29; 280/165
(58) Field of Search ................... 301/37.371, 37.372, 301/37.101, 37.102, 37.376, 5.1, 108.1, 108.4, 37.29, 37.106; 280/163, 164.1, 165; D12/202, 204, 212, 213

(56) References Cited

U.S. PATENT DOCUMENTS

| | | | |
|---|---|---|---|
| 182,839 A | 10/1876 | McDonald | |
| 579,133 A | 3/1897 | Cole | |
| 1,149,338 A | 8/1915 | Butcher | |
| 2,218,060 A | 10/1940 | Watson | |
| 2,336,959 A | 12/1943 | Redman | |
| 2,344,306 A | 3/1944 | Hyman | |
| D167,801 S | * 9/1952 | McLeod | ................. 301/37.29 |
| D170,463 S | 9/1953 | Jenkins, Jr. | |
| D173,489 S | 11/1954 | Jenkins, Jr. | |
| 2,746,806 A | * 5/1956 | Jenkins, Jr. | ............... 301/37.29 |
| 2,751,256 A | * 6/1956 | Adams | .................... 301/37.29 |
| 2,792,261 A | * 5/1957 | Tell et al. | ................ 301/37.29 |
| 3,288,488 A | 11/1966 | Shinn | |
| 3,734,534 A | 5/1973 | Brooks, Jr. et al. | |
| 3,747,150 A | 7/1973 | Kozub | |
| 4,440,411 A | 4/1984 | Hess | |
| 4,463,990 A | * 8/1984 | Beisch | ..................... 301/37.29 |
| 4,657,309 A | * 4/1987 | Kang | ....................... 301/37.29 |
| 4,669,787 A | * 6/1987 | Hempelmann | ........... 301/37.29 |
| 4,844,551 A | * 7/1989 | Hempelmann | ........... 301/37.29 |
| 4,932,724 A | 6/1990 | Wright | |
| 6,676,223 B2 | * 1/2004 | Kolpasky | ..................... 301/5.1 |

OTHER PUBLICATIONS

Article: "MATEJA: It's All Goo For GM Design Team," Chicago Tribune, Jun. 14, 2001.

* cited by examiner

Primary Examiner—Russell D. Stormer
Assistant Examiner—Jason R. Bellinger
(74) Attorney, Agent, or Firm—Clausen Miller, P.C.

(57) ABSTRACT

An improved tire step that is capable of mounting to a vehicle wheel's support studs to enable a person to use the step to elevate himself off of the ground to reach a portion of the vehicle. In one form, the tire step comprises a first ring having a plurality of holes positioned in a spaced apart relationship around the ring. A second ring is provided and a plurality of spaced apart bars joins the first ring to the second ring.

9 Claims, 1 Drawing Sheet

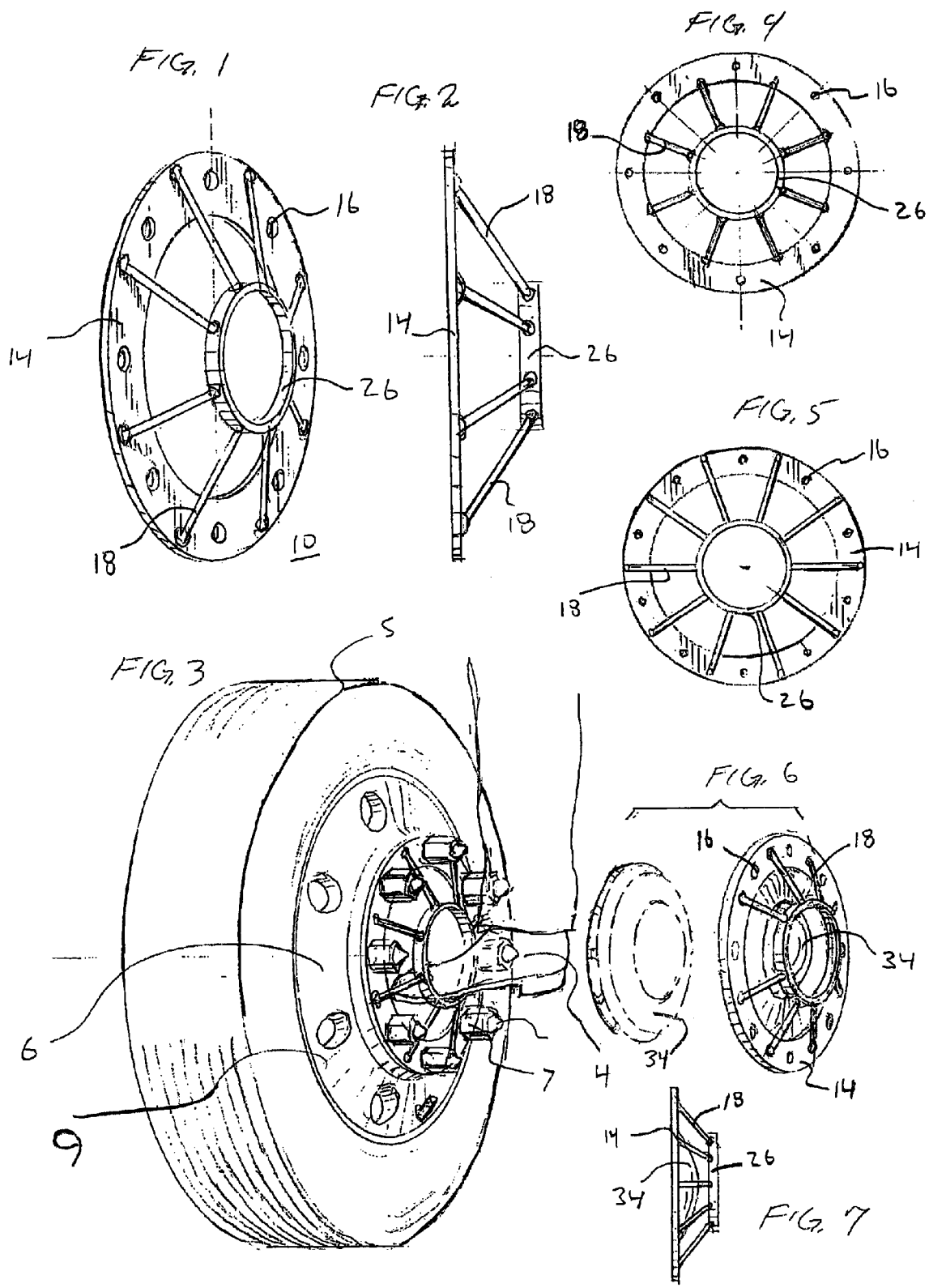

TIRE STEP

FIELD OF THE INVENTION

The present invention relates to tire steps, and more particularly to tire steps that are mounted to the wheel supporting studs of a vehicle.

BACKGROUND OF THE INVENTION

A recognized safety hazard in the trucking business has been the practice of drivers to use one of the vehicle's tires or other part of the vehicle as a step. Truck components, such as tires, are not designed for use as a step and such misuse of the components puts a person at high risk of injury. Vehicle steps of various types are known in the art. Such devices are typically used to provide a means for a person to lift themselves off of the ground and into a vehicle's seat. Some of these devices are used by a person when the person needs to elevate himself to a portion of the vehicle to access a particular part of the vehicle.

Previous vehicle step devices have some inherent disadvantages. One of the disadvantages with existing step devices is that they do not provide a design that can be easily adapted for a variety of different vehicle makes and models. Another disadvantage is that they are not simple in design and inexpensive to construct and are therefore not practical nor in widespread use. Further, many of the existing tire step devices are not aesthetic in appearance when in position on a vehicle.

The present invention overcomes these and other problems inherent in existing vehicle step devices. The present invention provides a tire step that, in one form, comprises a first mounting ring having spaced apart holes and connected to a second step ring by a series of spaced apart rods or bars. The mounting ring may mount to a vehicle's wheel by aligning the holes in the ring with the wheel's support studs and fastening the vehicle's lug nuts to the studs and against the ring so the ring is supported by the studs and fastened to the wheel by the studs. Once the tire step is mounted, a person may step on the second step ring to elevate herself off of the ground and into a position where she could more easily reach the vehicle's windshield or other part of the vehicle.

The principal object of the present invention is to provide an improved tire step that easily mounts to a vehicle's wheel supporting studs.

Another object of the present invention is to provide a novel tire step that provides a safe step for a vehicle.

Still another object of the present invention is to provide a novel tire step that is attractive in appearance when in place on the vehicle.

A further object of the present invention is to provide a novel tire step that is easily adaptable to fit a variety of different vehicles.

A further object of the present invention is to provide a novel tire step that does not require modification of the existing vehicle rim, hub or lug nuts.

A further object of the present invention is to provide a novel tire step which does not adversely affect a vehicle when it is attached to the vehicle's wheels.

A further object of the present invention is to provide a novel tire step which is simple in design and inexpensive to construct, and is durable and rugged in structure.

Still further objects and advantages will become apparent from a consideration of the ensuing description and drawings of the invention.

SUMMARY OF THE INVENTION

These and other objects are achieved by a tire step of the present invention. In one form of the invention, a tire step is provided which comprises a first mounting ring having a plurality of holes positioned in a spaced apart relationship around the first ring. The first ring is connected to a second inner step ring by a series of rods or bars positioned in a spaced apart relationship. The first ring may mount to a vehicle's wheel by fastening the vehicle's lug nuts against the first ring so the first ring is supported by the vehicle's wheel support studs. Once the tire step is mounted to the vehicle's wheel, a person may step on the second step ring to elevate herself off of the ground and into a position where she could more easily reach the vehicle's windshield, for example.

BRIEF DESCRIPTION OF THE DRAWINGS

FIG. 1 is a front perspective view of one embodiment of the tire step of the present invention;

FIG. 2 is a side view of the tire step of FIG. 1;

FIG. 3 is a perspective view of the tire step of FIG. 1 shown mounted to a vehicle's rim and with a person's foot inserted into the step ring;

FIG. 4 is a front view of an alternate embodiment of the tire step of FIG. 1;

FIG. 5 is a front view of another alternate embodiment of the tire step of FIG. 1;

FIG. 6 is a perspective view of another embodiment of tire step of FIG. 1 shown with a hub cap (in dashed lines); and FIG. 7 is a side view of the tire step device of FIG. 6 shown with a hub cap in position inside the mounting ring.

DETAILED DESCRIPTION OF THE INVENTION

FIG. 1 is a front perspective view of one embodiment of the tire step 10 constructed in accordance with the present invention. In FIG. 1, the tire step 10 comprises a first mounting ring 14 having spaced apart holes 16, a second step ring 26 and connecting spokes, rods or bars 18 joining second ring 26 to first ring 14 substantially as shown in FIG. 1. Also, as shown in FIG. 3, one embodiment of the tire step 10 is mounted to a wheel with a person's foot 4 inserted into ring 26.

The wheel 9 shown in FIG. 3 has a tire 5, rim 6, wheel supporting studs 8 and lug nuts 7. The tire step 10 may mount to wheel 9 by positioning holes 16 over corresponding wheel supporting studs 8, inserting studs 8 into holes 16 and fastening lug nuts 7 onto studs 8 whereby the first ring 14 will be removably secured to wheel 9.

As shown in FIGS. 1 and 2, mounting ring 14 may have eight holes 16 positioned in a spaced apart relationship around ring 14 substantially as shown. Step ring 26 may be fixed to ring 14 by connecting spokes 18 whereby each spoke 18 has two ends, one end attached to ring 14 and the second end attached to ring 26 as shown in FIG. 1. In one embodiment, connecting spoke 18 first end may be attached to first ring 14 substantially equidistant between two holes 16 as shown in FIG. 1. In another embodiment, one connecting spoke 18 may be fixed to first ring 14 between every other adjacent hole 16. For example, if ring 14 has eight holes 16 then four spokes 18 would be connected to ring 14. In yet other embodiments of the tire step device 10, connecting spokes 18 may be positioned and connected to first ring 14 in any arrangement which will provide for proper operation of tire step 10. For example, in one embodiment, tire step device 10 may contain two connecting spokes 18. In yet other embodiments, tire step device 10 may contain more than two connecting spokes 18. The connecting spokes 18 may be attached to first ring 14 at an outer perimeter of first ring 14 as shown in FIG. 1. In yet another embodiment, connecting spokes 18 may be attached to ring 14 at an inner perimeter of ring 14 as shown FIG. 4. In yet other embodiments, connecting spokes 18 may be attached to ring 14 at any location on ring 14 and spokes 18 may also be attached to ring 14 whereby spokes 18 are not all located in a common circumference relationship around ring 14.

Connecting spokes 18 may be attached to ring 14 by welding, adhesives, fasteners and/or any other means which will provide for proper operation of tire step 10. Connecting spokes 18 may be attached to second ring 26 by welding, adhesive, fasteners or any other means which will provide for proper operation of tire step 10. In one embodiment, connecting spokes 18 may attach to second ring 26 along the outer perimeter of second ring 26 as shown in FIGS. 1 and 2. In yet other embodiments, connecting spokes 18 may attach to ring 26 in any way that will provide for proper operation of tire step 10. In still yet other embodiments, tire step device 10 may be formed from a molding process. In yet other embodiments, tire step device 10 may be made of one or more materials such as aluminum, steel, stainless steel, hardened plastic, composites, or any other type of material which will support the weight of a person, have rust resistant properties to protect against corrosion and provide for proper operation of tire step 10.

Turning to FIG. 5, tire step 10 may comprise ten holes 16 equally spaced on first ring 14 substantially as shown in FIG. 5. In yet other embodiments, tire step 10 may contain any number of holes 16 required for the application and/or conditions tire step 10 will be used for once attached to a vehicle's wheel. Also, the number of holes 16 provided on first ring 14 may vary depending upon the number of wheel supporting studs 8 located on a wheel 9 of a vehicle.

As shown in FIG. 3, tire step 10 may mount to a wheel 9 by positioning holes 16 over corresponding wheel supporting studs 8 and fastening lug nuts 7 to wheel supporting studs 8 to provide for first ring 14 to be removably secured to wheel 9. Once tire step 10 is securely positioned to wheel 9, a person may place his or her foot 4 inside of second ring 26. As shown in FIG. 3, a person's foot 4 is positioned easily inside of second ring 26.

In one embodiment of the step 10, holes 16 may all have the same diameter. In other embodiments, holes 16 may have different diameters. For example, in one form of the invention, ring 14 may have five holes 16 with diameters of about 1½" and five holes 16 with diameters of about 3¼". In one embodiment, ring 26 may have a thickness of about ½ and may be spaced apart from ring 16 by about 3". In yet other embodiments, ring 14, in one form of tire step 10, may have a thickness of about ⅛". In yet other embodiments of tire step 10, the dimensions of ring 14, holes 16, bars 18 and ring 26 may be any size necessary for the required application of vehicle step 10. Ring 26 may be spaced apart from ring 16 by more than or less than 3".

As shown FIG. 6, a hub cap 34 may be provided which can be positioned within first ring 14. FIG. 7 shows a hub cap 34 in place within first ring 14. Hub cap 34 may provide for a more aesthetic and safer operating conditions for a vehicle using tire step 10. In one embodiment, hub cap 34 may be secured by positioning hub cap 34 into the wheel 9. As shown FIG. 3, tire step 10 when in place on wheel 9 minimally extends past outer portion of tire 5. The hub cap 34 may be made of one or more materials such as aluminum, steel, stainless steel, hardened plastic, composites, or any other type of material which will have rust resistant properties to protect against corrosion and provide for proper operation of tire step 10.

In use, once tire step 10 is securely fastened to wheel 9 as described herein, a user may then use tire step 10. A user would position his or her foot 4 inside of second ring 26 substantially as shown in FIG. 3 and elevate himself off of the ground and into a position where he could more easily reach the vehicle's windshield or other component of the vehicle. As shown in FIG. 3, when the person's foot 4 is inside of ring 26 the person is positioned so that the front of her body is facing the vehicle. However, the person may turn her body so that one of her sides is facing the vehicle. It is important for a person to be able to adjust her body position with respect to the vehicle when using the tire step so that she can more easily accomplish whatever task necessary. While in place on a vehicle, the tire step 10 is attractive in appearance and does not interfere with the use of the vehicle. Further, in the event that the vehicle's wheel 9 needs to be removed, the tire step is easily removed from the vehicle's wheel 9 by removing the lug nuts 7 as would be required in any event when a wheel 9 is removed from the vehicle. The tire step 10 is easily adaptable to fit a variety of different vehicles regardless of the wheel's 9 dimensions or number of wheels 9 located on a vehicle. The tire step 10 does not require modification of the existing vehicle's rim hub or lug nuts. Further, the tire step 10 will not interfere with the balance of the vehicle's wheels.

Specific embodiments of novel methods and apparatus for construction of novel tire steps according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A tire step device that attaches to a vehicle wheel's support studs, said step device comprising:

a first ring having a plurality of spaced apart holes, said holes positioned on the ring to receive the corresponding wheel's support studs;

a second ring having an outer diameter smaller than the first ring outer diameter; and a means for connecting the first ring to the second ring whereby the second ring is spaced apart from said first ring.

2. The tire device of claim 1 wherein the means for connecting are a plurality of spaced apart rods.

3. The tire step device of claim 1 wherein the first ring has eight holes equally spaced apart around the ring.

4. The tire step device of claim 1 wherein the means for connecting is eight rods and the second ring is connected to the first ring by said eight rods which are equally spaced around the first ring and the second ring.

5. The tire step device of claim 1 further comprising a hub cap wherein the hub cap fits within the first ring inner diameter.

6. The tire step device of claim 4 wherein the eight rods are connected to the first ring at the outer diameter of the first ring.

7. The tire step device of claim 4 wherein the eight rods are connected to the first ring at the inner diameter of the first ring.

8. The tire step device of claim 1 wherein the first ring has ten holes equally spaced apart around the ring.

9. The tire step device of claim 1 wherein the means for connecting is ten bars and the second ring is connected to the first ring by said ten bars which are equally spaced around the first ring and the second ring.

* * * * *